United States Patent [19]

Takizawa

[11] Patent Number: 4,939,956
[45] Date of Patent: Jul. 10, 1990

[54] SYSTEM FOR CONTROLLING SERVO ACTIVATING HYDRAULIC PRESSURE OCCURRING IN VEHICULAR POWER TRAIN

[75] Inventor: Satoshi Takizawa, Yokosuka City, Japan

[73] Assignee: Nissan Motor Company Limited, Yokohama City, Japan

[21] Appl. No.: 230,383

[22] Filed: Aug. 9, 1988

[30] Foreign Application Priority Data

Aug. 10, 1987 [JP] Japan .................. 62-121408[U]
Dec. 26, 1987 [JP] Japan .................. 62-197729[U]

[51] Int. Cl.$^5$ .................................................. B60K 41/06
[52] U.S. Cl. .................................................. 74/858; 74/867
[58] Field of Search ................ 74/866, 867, 868, 861, 74/858, 860; 192/0.076, 3.58, 103 F, 109 F; 123/418, 419, 425; 364/424.1

[56] References Cited

U.S. PATENT DOCUMENTS

| | | | |
|---|---|---|---|
| 3,956,947 | 5/1976 | Leising et al. | 74/866 |
| 4,572,031 | 2/1986 | Yokooku et al. | 74/866 |
| 4,616,521 | 10/1986 | Akashi et al. | 74/866 X |
| 4,622,866 | 11/1986 | Ito et al. | 74/866 |
| 4,630,583 | 12/1986 | Suzuki et al. | 74/860 X |
| 4,677,878 | 7/1987 | Yamamori et al. | 74/861 |
| 4,703,304 | 10/1987 | Muguruma et al. | 74/861 X |
| 4,720,793 | 1/1988 | Watanabe et al. | 74/866 X |
| 4,760,823 | 8/1988 | Yasuoka et al. | 74/860 |
| 4,809,660 | 3/1989 | Marsh et al. | 123/418 X |

FOREIGN PATENT DOCUMENTS

| | | |
|---|---|---|
| 2703441 | 8/1978 | Fed. Rep. of Germany . |
| 3613332 | 11/1986 | Fed. Rep. of Germany . |
| 61-149657 | 7/1986 | Japan .................. 74/860 |
| 1449909 | 10/1973 | United Kingdom . |

Primary Examiner—Dwight Diehl
Attorney, Agent, or Firm—Foley & Lardner, Schwartz, Jeffery, Schwaab, Mack, Blumenthal & Evans

[57] ABSTRACT

According to the present invention, in order to effect a shockless shift in an automatic transmission of a vehicular power train, a servo activating hydraulic fluid pressure applied to a shifting friction unit is controlled in response to a predetermined variable other than an engine throttle opening which causes a change in engine output torque from a predetermined pattern of variation of the engine output torque against variation of the engine throttle opening.

7 Claims, 8 Drawing Sheets

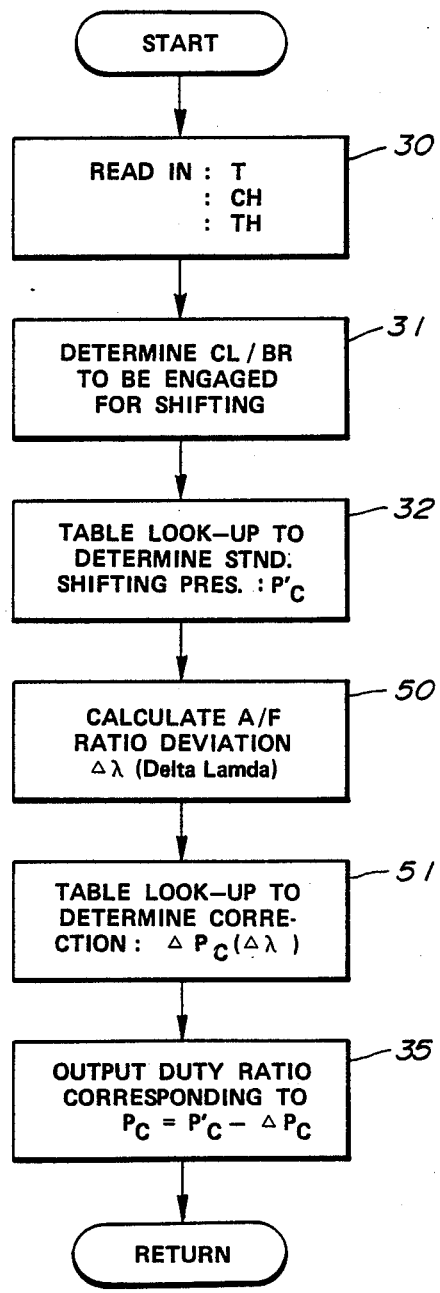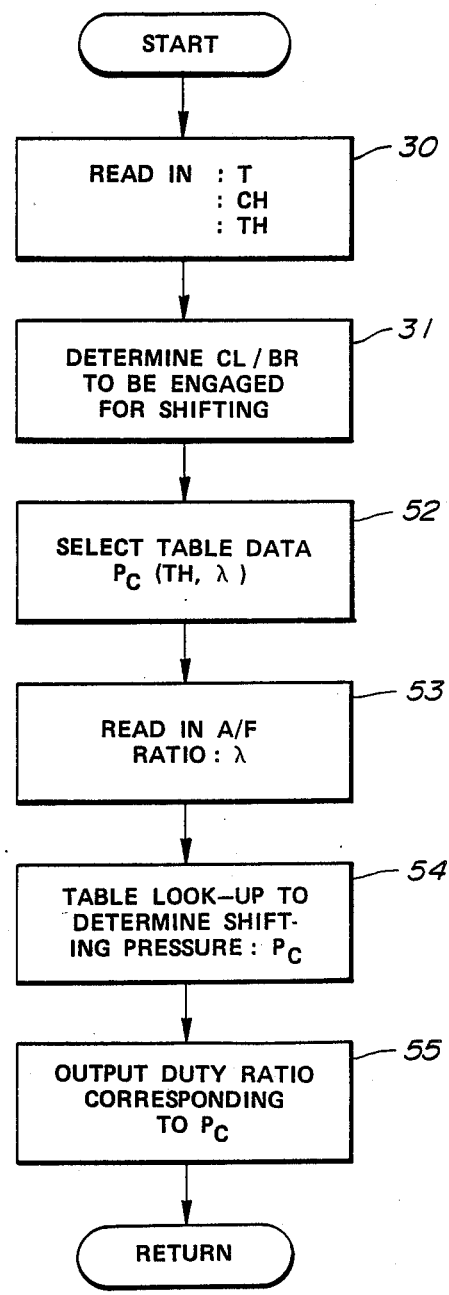

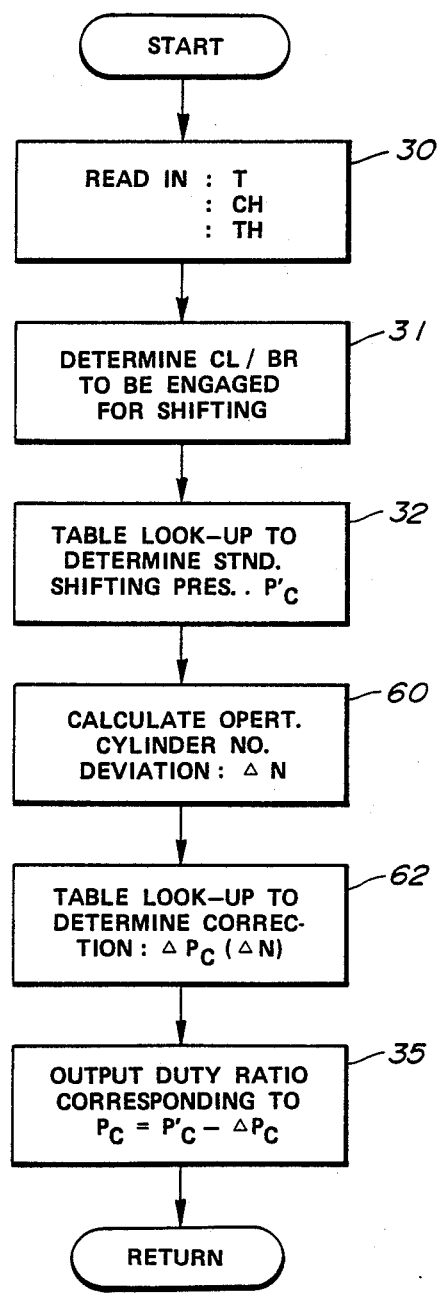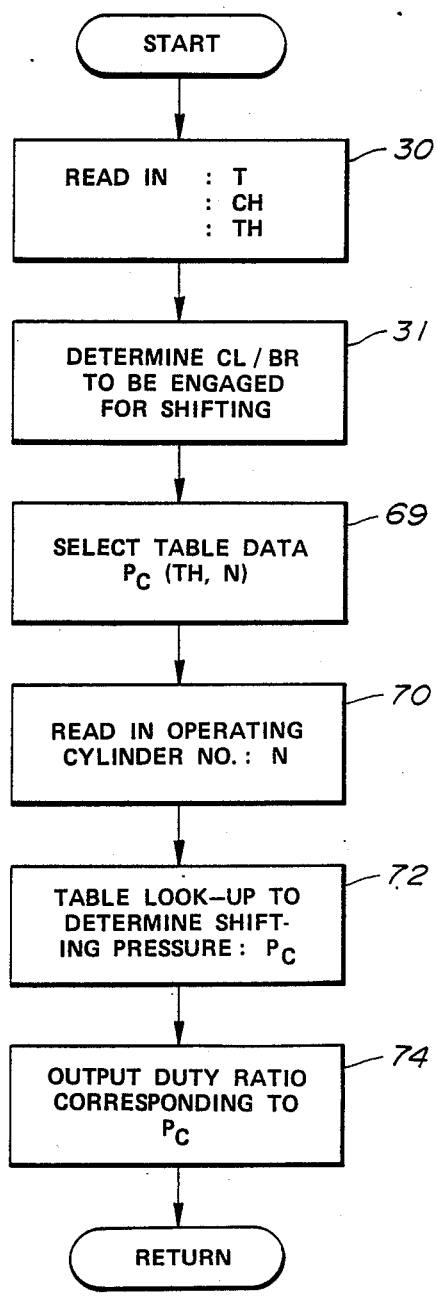

SYSTEM FOR CONTROLLING SERVO ACTIVATING HYDRAULIC PRESSURE OCCURRING IN VEHICULAR POWER TRAIN

BACKGROUND OF THE INVENTION

The present invention relates generally to a vehicular power train including an automatic transmission and an engine which, with the same throttle position, can produce different output torques in response to a change in another operating variable other than the throttle position. More particularly, the present invention relates to a system for controlling the a servo activating hydraulic pressure acting on a servo motor of a shifting friction unit, such as a clutch or a brake, after a shift command signal has been generated by an automatic transmission control unit.

It is the common practice in automatic transmission design to provide a regulator valve which generates a hydraulic fluid pressure (i.e., a line hydraulic fluid pressure) variable in a pattern predetermined in response to throttle position. The known automatic transmission also includes a control unit or module which generates a shift command when predetermined variables, such as vehicle speed and throttle position, attain a predetermined relationship. Upon receiving the shift command, one of shift valves shifts to initiate supply of the line pressure toward an associated servo motor for a friction unit, such as a clutch, assigned for shifting. Thus, a hydraulic fluid pressure acting in the servo motor of the friction unit, which may be called a servo activating hydraulic fluid pressure, starts to rise. In order to moderate such a rise in the servo activating hydraulic fluid pressure, there is provided an accumulator in association with a hydraulic fluid line which leads to the servo motor from the associated shift valve.

With the same throttle position, the engine output torque reduces in response to a change in engine ignition timing to a retard ignition position which occurs upon detecting a tendency of an engine to knock or a change in compression ratio to a relatively low compression value which occurs upon detecting a change in operating condition or a change in A/F ratio to the lean air fuel mixture side. In the case of an internal combustion engine provided with a supercharger, with the same throttle position, the engine output torque increases in response to a change from inoperative state of the supercharger to operative state thereof.

If the same servo activating hydraulic fluid pressure is used to activate a friction unit which is asigned for shifting after the engine output torque has reduced, the period of time during which engagement of the friction unit proceeds becomes short, causing considerable shock to occur. If the same servo activating hydraulic fluid pressure is used after the engine output torque has increased, the engagement capacity of a friction unit runs short.

An object of the present invention is to provide a system for controlling servo activating hydraulic fluid pressure applied to a shifting friction in such a manner as to effect a shockless shift in an automatic transmission even if there occurs a change in engine output torque of the above-mentioned character.

SUMMARY OF THE INVENTION

According to the prevent invention, in order to accomplish the above-mentioned object, a servo activating hydraulic fluid pressure applied to a shifting friction unit is controlled in response to a predetermined variable other than a throttle opening which causes a change in engine output torque from a predetermined pattern of variation of the engine output torque against variation of the throttle opening.

More specifically, according to the present invention, there is provided an accumulator for controlling a rise in servo activating hydraulic fluid pressure applied to a shifting friction unit, a back-up pressure of the accumulator is electromagnetically controlled in response to an output of a control unit supplied with a predetermined variable other than an engine throttle opening which causes a change in engine output torque from a predetermined pattern of variation of the engine output torque against variation of the throttle opening.

BRIEF DESCRIPTION OF THE DRAWINGS

FIG. 7 is a flowchart of a control program used in a third embodiment according to the present invention;

FIG. 8 is a flowchart of a modified alternative control program which may be used in the third embodiment;

FIG. 10 is a flowchart of a control program used in a fifth embodiment according to the present invention; and FIG. 11 is a flowchart of a modified control program which may be used in the fifth embodiment according to the present invention.

DETAILED DESCRIPTION OF THE INVENTION

Figure 1A:
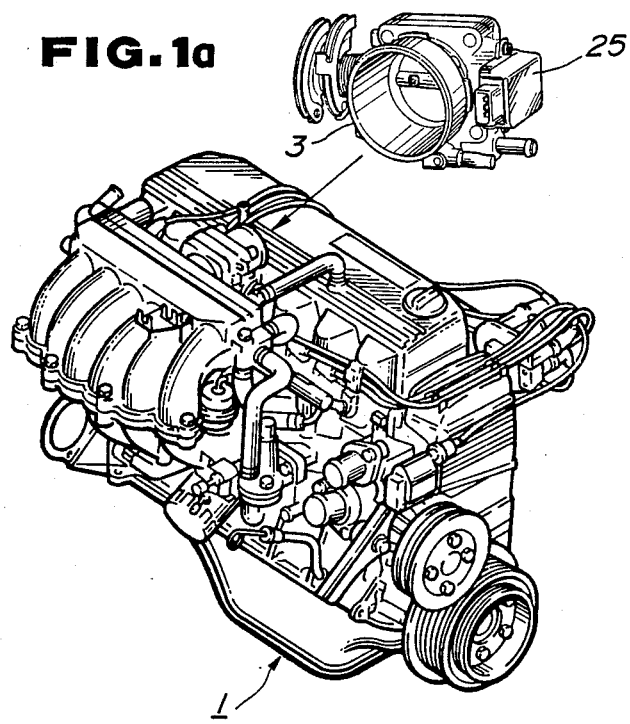
FIGS. 1(a) and (b) are a depiction and a schematic representation respectively, of a vehicular electronic control module used to control a duty solenoid for regulating the back-up pressure in an accumulator that controls a servo activating hydraulic fluid pressure.
Figure 1B:
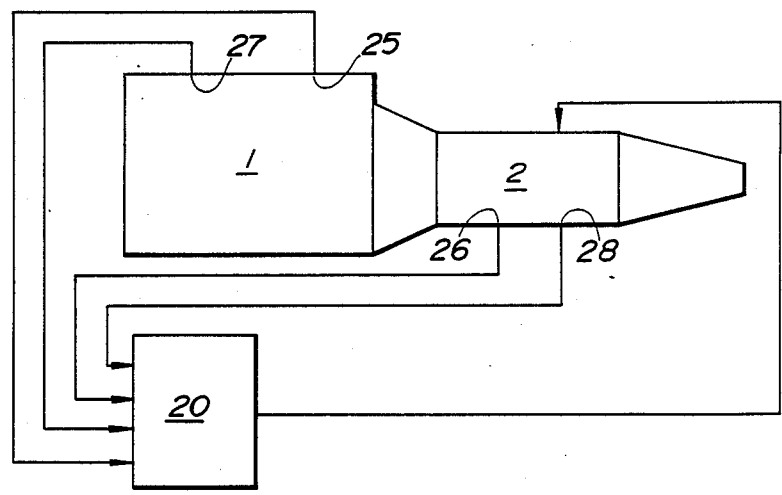

In FIG. 1(a) there is shown a perspective view of an internal combustion engine 1 of a vehicular power train. The power train also includes an automatic transmission 2 following the engine 1 (FIG. 11b). The engine 1 includes a throttle valve chamber 3 equipped with a throttle sensor 25 which converts an opening degree of the throttle flap into an electric voltage signal. The electric voltage signal generated by this throttle sensor 25 is therefore variable in proportion to the throttle opening. The engine 1 also includes an ignition control unit 27 which causes the ignition timing to retard when the output of a knock sensor indicates that the engine tends to knock. This retard angle is determined by the ignition control unit 27. The automatic transmission includes an automatic transmission control unit 26 which generates a shift command instructing a change from one ON-OFF pattern of shift solenoids that are used to shift the associated shift valves to another. In order to continuously measure temperature of transmission oil, an oil temperature sensor 28 is disposed in a control valve assembly of the automatic transmission. The oil temperature sensor 28 converts the oil temperature into an electric signal. Thus, the electric signal of the oil temperature sensor 28 is variable in proportion to the temperature of the transmission oil.

The automatic transmission includes a plurality of friction units, such a brakes and clutches, which are selectively engaged to provide a plurality of forward speed ratios and a reverse. Among all of the friction units, only one is shown and designated at 10 in FIG. 2. As mentioned before, the engine used in this embodiment is provided with the ignition timing control unit 27 designed to retard the ignition timing in response to the output of the knock sensor. This results in a drop in the engine output torque.

Figure 2:
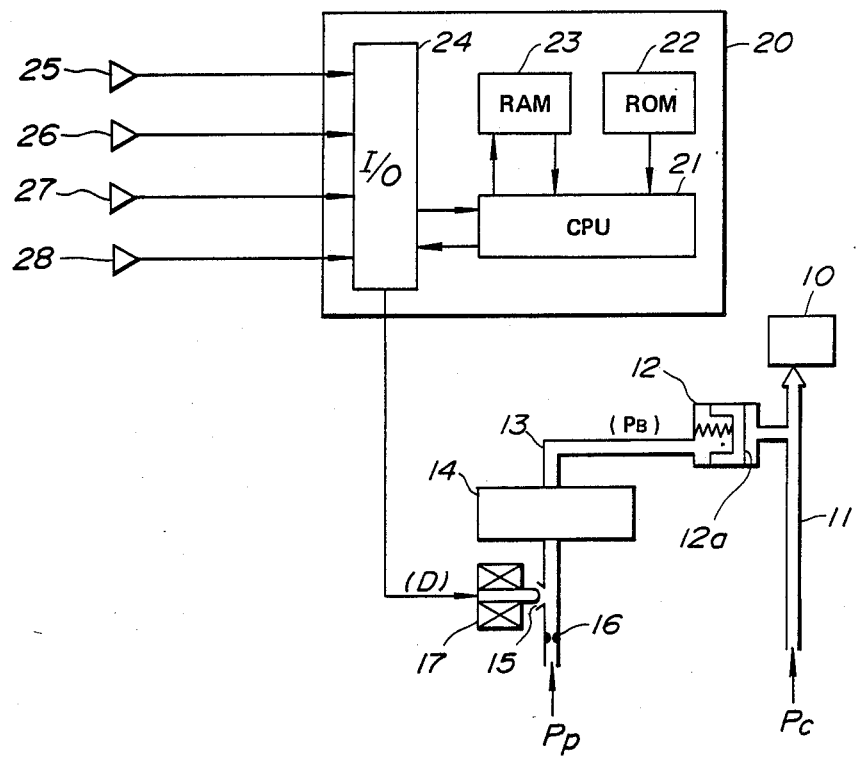
FIG. 2 is a schematic view of a hydraulic circuitry including the accumulator and the solenoid in association with a microcomputer based control unit

As shown in FIG. 2, the friction unit 10 is engaged in response to a servo activating hydraulic pressure $P_C$ acting in the servo motor of the friction unit 10. The servo activating hydraulic pressure $P_C$ is delivered to the clutch 10 via a hydraulic fluid line 11 from the corresponding shift valve, not shown, activated by the corresponding shift solenoid, not shown. After a shift command has been generated by the automatic transmission control unit 26, the rise in the servo activating hydraulic fluid pressure $P_C$ in the line 11 is controlled by an accumulator 12. The accumulator 12 is subject to a back-up pressure $P_B$ supplied thereto. The relationship between the servo activating hydraulic fluid pressure $P_C$ and the back-up pressure $P_B$ is such that the rise in servo activating hydraulic fluid pressure $P_C$ within the friction unit 10 becomes gradual as the back-up pressure $P_B$ is lowered since the back-up pressure $P_B$ acts on an accumulator piston 12a as opposed to the servo activating hydraulic pressure $P_C$. The back-up pressure $P_B$ is generated by an accumulator control valve 14 and supplied to the accumulator 12 via a hydraulic fluid line 13. The accumulator control valve 14 receives a regulated hydraulic fluid pressure and controls the magnitude of the back-up pressure $P_B$ in response to the regulated hydraulic fluid pressure. this regulated hydraulic fluid pressure becomes as high as a pilot hydraulic fluid pressure supplied via an orifice 16 when a duty solenoid 17 is engergized to close a drain port 15. This solenoid 17 is controlled by an ON-OFF electric signal.

The duty ratio D is a ratio of the period of ON time to the period of one cycle expressed in terms of a percentage. If the duty ratio D increases, the amount of fluid discharged via the drain port 15 decreases, causing a drop in the regulated hydraulic fluid pressure similar to the accumulator control valve 14. Thus, the back-up fluid pressure $P_B$ varies in response to the duty ratio D.

The duty ratio D is determined by a microcomputer based control unit 20 which includes in the usual manner a central processor unit (CPU) 21, a read only memory (ROM) 22, a random acess memory (RAM) 23 and an input output control circuit (I/O) 24. The I/O 24 has a plurality of input terminals which are connected to receive inputs. The inputs include throttle position from the throttle sensor 25, a retard angle of ignition timing from the ignition timing control unit 27, a shift command issued by the automatic transmission control unit 26, a transmission oil temperature from the oil temperature sensor 28. Although the throttle position is used as information representing the engine torque, other variables, such as engine intake vacuum, intake air, fuel injection amount, may be used to represent the engine torque. Based on these inputs, the CPU 21 executes a control program stored in the ROM 22 to determine the duty ratio D. Based on the output of the control unit 20 indicative of the duty ratio D, the solenoid 17 is energized to control the effectiv opening of the drain port 15. The control program is described hereinafter along with a flowchart shown in FIG. 3.

Figure 3:
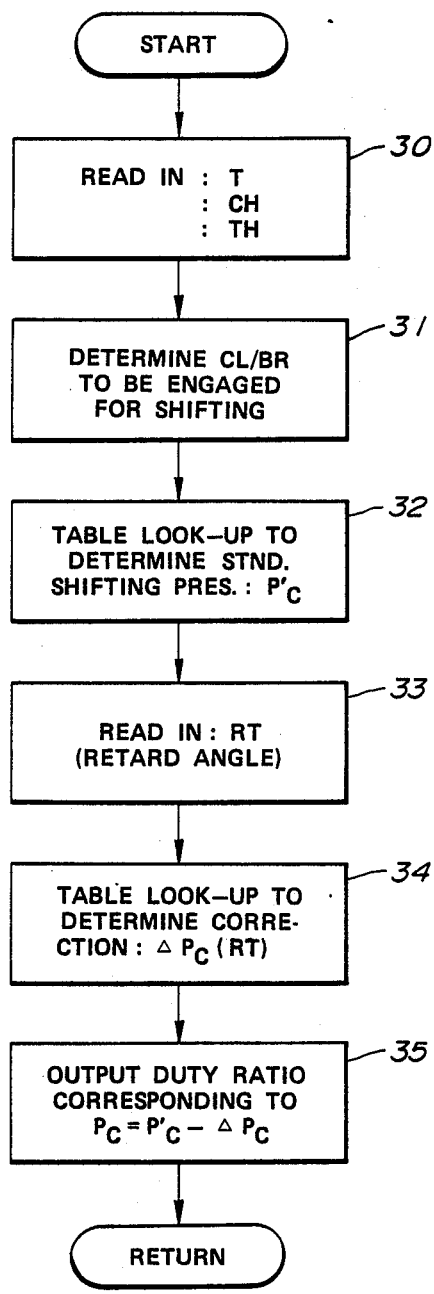
FIG. 3 is a flowchart of a control program stored in the control unit.

Referring to the flowchart shown in FIGS. 3, at a step 30, a read-in operation is performed to store a throttle opening TH, a shift command CH and a transmission oil temperature T. The shift command may be an upshift between any two of a plurality of speed ratios or a downshift between any two of the plurality of speed ratios. At a step 31, it is judged based on the stored shift command CH which kind of shift is about to take place and which friction unit is about to be engaged. A plurality of table data are stored in the ROM 22 for different kinds of shifts, each containing standard values of servo activating hydraulic pressure $P_C'$ against various sets of values of throttle opening TH and values of transmission oil temperature T. Let it be assumed now that an upshift initiated by the engagement of the friction unit 10 is demanded by the shift command CH. At a step 32, among the plurality of table data stored in the ROM 22, a predetermined one table data for the above mentioned upshift is selected and a table look-up operation of the selected table data is performed using the stored throttle opening TH and the stored oil temperature T to determine a standard servo activating hydraulic presure $P_C'$ which is often called as a standard shifting pressure. At a step 33, a read-in operation is performed to store a retard angle RT of ignition timing determined by the ignition timing control unit 27 in response to the output of the knock sensor. The ingnition control unit 27 carries out the correction of the ignition timing to the retard angle RT when the engine tends to knock. The engine torque drops in accordance with the retard angle RT. A table data is stored in the ROM 22 which contains various correction values of servo activating hydraulic fluid pressure versus various retard angle values. At a step 34, a table look-up operation of this table data is performed to determine a correction value $\Delta P_C$ as a function of the retard angle RT stored. At a step 35, a servo activating hydraulic fluid pressure $P_C$ is given by subtracting $\Delta P_C$ from $p_c'$ and a duty ratio D corresponding to this servo activating hydraulic fluid pressure $P_C$ is determined, and an electric current with this duty ratio D is allowed to pass through the duty solenoid 17.

Owing to this control, the servo activating hydraulic fluid pressure supplied to the friction unit 10 is lowered in response to a drop in the engine torque caused by the retard control of the ignition timing, preventing the servo activating hydraulic fluid pressure from increasing excessively. Thus, the occurence of shocks is avoided.

Figure 4:
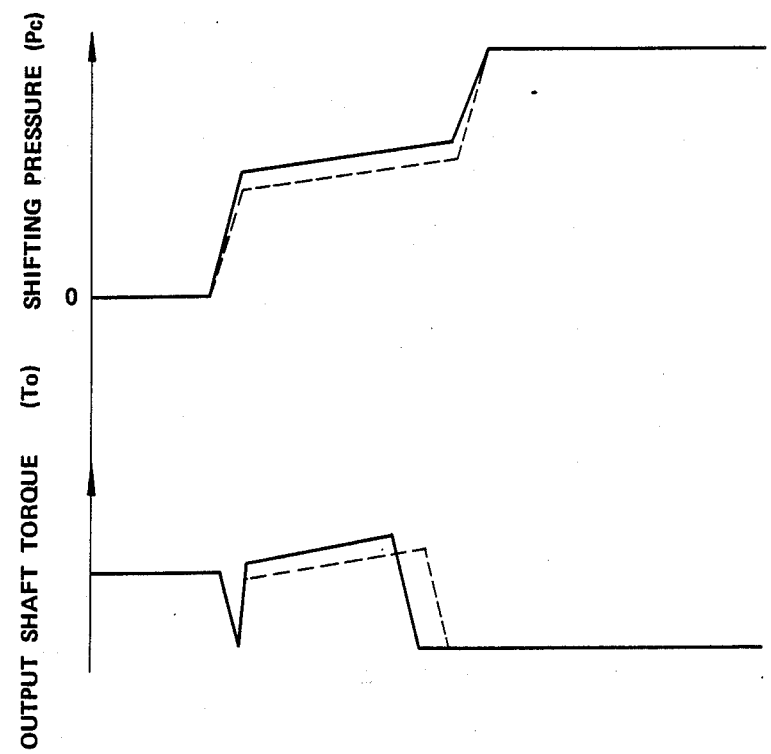
FIG. 4 is a chart showing the patterns of variation of servo activating hydraulic pressure and that of a transmission output torque upon engagement of a friction unit for an upshift.

FIG. 4 is a time chart showing two patterns of servo activating hydraulic fluid pressure and two patterns of transmission output shaft torque during the upshift involving the engagement of the friction unit 10. The fully drawn patterns represent the normal upshift, whereas the broken line drawn patterns represent the upshift when there is the drop in the engine torque due to the retard of the ignition timing. From this chart, it will now be understood that the shift is effected with the relatively low servo activating hydraulic pressure as shown by the broken line drawn pattern, the period of shift elongates as will be recognized from the broken line drawn pattern of variation of the transmission output shaft torque $T_O$. Thus, the occurrence of substantial shocks is avoided.

In the embodiment as described above, the servo activating hydraulic fluid pressure $P_C$ is corrected in accordance with the retard control of the ignition timing. The same object can be accomplished by correcting the servo activating hydraulic fluid pressure $P_C$ in response to a change in compression ratio in the case the associated engine is subject to such a change in compression ratio to meet the stringent exhaust gas emission requirements or a change in air fuel ratio in the case the associated engine is subject to such a change in air fuel ratio to meet the stringent exhaust gas emission requirments or a change in state of a supercharger in the case the associated engine is subject to such a change in state of the supercharger.

Figure 5:
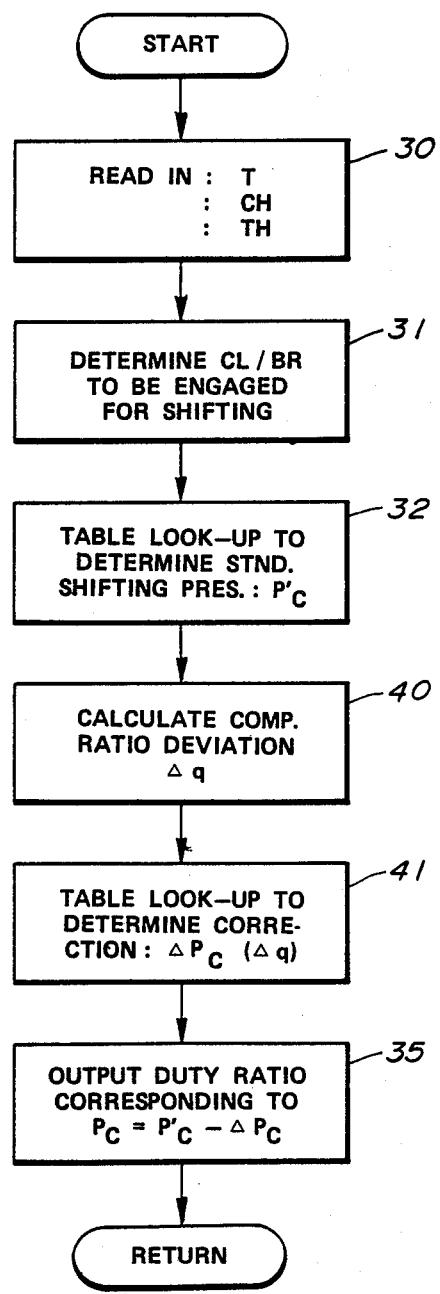
FIG. 5 is a flowchart of a control program used in a second embodiment according to the present invention.

FIG. 5 is a flowchart of a control program used in a second embodiment where the present invention is applied to a vehicular power train including an internal combustion engine of the variable compression ratio type. Such an internal combustion engine is provided with a compression ratio control unit. The hardware of this embodiment is substantially the same as the previously described first embodiment exept that a compression ratio q determined by the compression ratio control unit is used as an input in the place of the retard angle of ignition timing RT.

Referring to the flowchart shown in FIG. 5, the same reference numerals as used in FIG. 3 are used to designate similar steps. Thus, new steps are mainly described. At a step 40, a read-in operation is performed to obtain a compression ratio q from the compression ratio control unit and a deviation $\Delta q$ from a standard compression ratio is calculated. The compression ratio control unit carries out the correction of the compression ratio in response to operating condition. The engine torque drops in accordance with a change in compression ratio from a relatively high value to a relatively low value. A table data is stored in the ROM 22 which contains various correction values of servo activating hydraulic fluid pressure versus various deviation values $\Delta q$. At a step 41, a table look-up operation of this table data is performed to determine a correction value $P_C'$ as a function of the compression ratio deviation $\Delta q$. At a step 35, a servo activating hydraulic fluid pressure $P_C$ is given by subtracting $\Delta P_C$ from $P_C'$ and a duty ratio D corresponding to this servo activating hydraulic fluid pressure $P_C$ is determined, and an electric current with this duty ratio D is allowed to pass through a duty solenoid 17.

Figure 6:
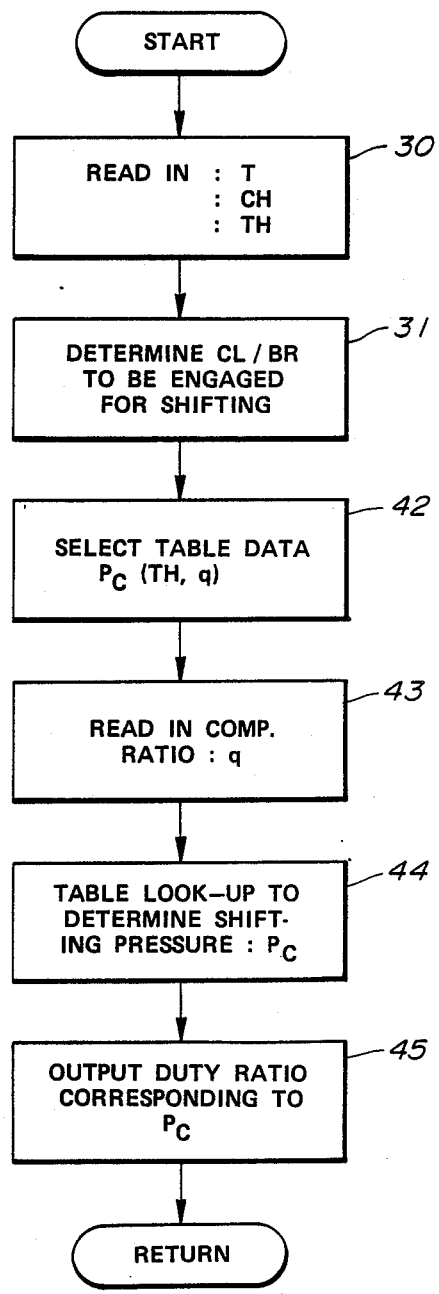
FIG. 6 is a flowchart of a modified alternative control program which may be used in the second embodiment.

FIG. 6 is a flowchart of a modification of the control program illustrated in FIG. 5. In this modification, a plurality of table data are stored in a ROM 22 for different kinds of shifts, each containing target values of servo activating hydraulic pressure $P_C$ against various sets of values of throttle opening TH and values of compression ratio q. After executing jobs at steps 30 and 31, among the plurality of table data stored in the ROM 22, a predetermined one table data for the shift instructed by the shift command CH stored at the step 30 is selected at a step 42. At a step 43, a read-in operation is performed to obtain a a compression ratio q from the compression ratio control unit. At a step 44, a table look-up operation of the selected table data is performed using the stored throttle opening TH and the stored compression ratio q to determine a target servo activating hydraulic fluid pressure $P_C$. At a step 45, a duty ratio D corresponding to the servo activating hydraulic fluid pressure $P_C$ is determined and an electric current with this duty ratio D is allowed to pass through a duty solenoid 17.

FIG. 7 is a flowchart of a control program used in a third embodiment where the present invention is applied to a vehicular power train including an internal combustion engine of the variable air fuel ratio type. In such an engine, the air fuel ratio is shifted to the lean mixture side to meet the exhaust gas emission requirements. Such an internal combustion engine is provided with an air fuel ratio control unit associated with an air fuel ratio $\lambda$ (lamda) sensor. The hardware of this embodiment is substantially the same as the first embodiment except that an air fuel ratio $\lambda$ (lamda) determined by the air fuel ratio control unit is used as an input in the place of the retard angle of ignition timing RT.

Referring to the flowchart shown in FIG. 7, the same reference numerals as used in FIG. 3 are used to designate similar steps. After executing jobs at steps 30, 31 and 32, a read-in operation is performed to obtain an air fuel ratio $\lambda$ (lamda) from the air fuel ratio control unt and a deviation $\Delta \lambda$ (delta lamda) from a standard air fuel ratio is calculated. The air fuel radio control unit carries out a change in air fuel ratio from the rich mixture side to the lean mixture side in reponse to a change in operating condition. The engine torque drops in accordance with a change in air fuel ratio to the lean side. A table data is stored in a ROM 22 which contains various correction values of servo activating hydraulic fluid pressure versus various deviation values $\Delta \lambda$ (delta lamda). At a step 51, a table look-up operation of this table data is performed to determined a correction value $P_C$ as a function of the air fuel ratio deviation $\Delta \lambda$ (delta lamda). At a step 35, a servo activating hydraulic fluid pressure $P_C$ is given by subtracting $\Delta P_C$ from $P_C'$ and a duty ratio D corresponding to this servo activating hydraulic fluid pressure $P_C$ is determined, and and electric current with this duty ratio D is allowed to pass through a duty solenoid 17.

FIG. 8 is a flowchart of a modification of the control program illustrated in FIG. 7. In this modification, a plurality of table data are stored in a ROM 22 for different kinds of shifts, each containing target values of servo activating hydraulic pressure $P_C$ against various sets of values of throttle opening TH and values of air fuel ratio $\lambda$ (lamda). After executing jobs at steps 30 and 31, among the plurality of table data stored in the ROM 22, a predetermined one table data for the shift instructed by the shift command CH stored at the step 30 is selectd at a step 52. At a step 53, a read-in operation is performed to obtain an air fuel ratio $\lambda$ (lamda) from the air fuel ratio control unit. At a step 54, a table look-up operation of the selected table data is performed using the stored throttle opening TH and the stored air fuel ratio $\lambda$ (lamda) to determined a target servo activatng hydraulic fluid pressure $P_C$. At a step 55, a duty ratio D corresponding to the servo activating hydraulic fluid pressure $P_C$ is determined and an electric current with this duty ratio D is allowed to pass through a duty solenoid 17.

Figure 9:
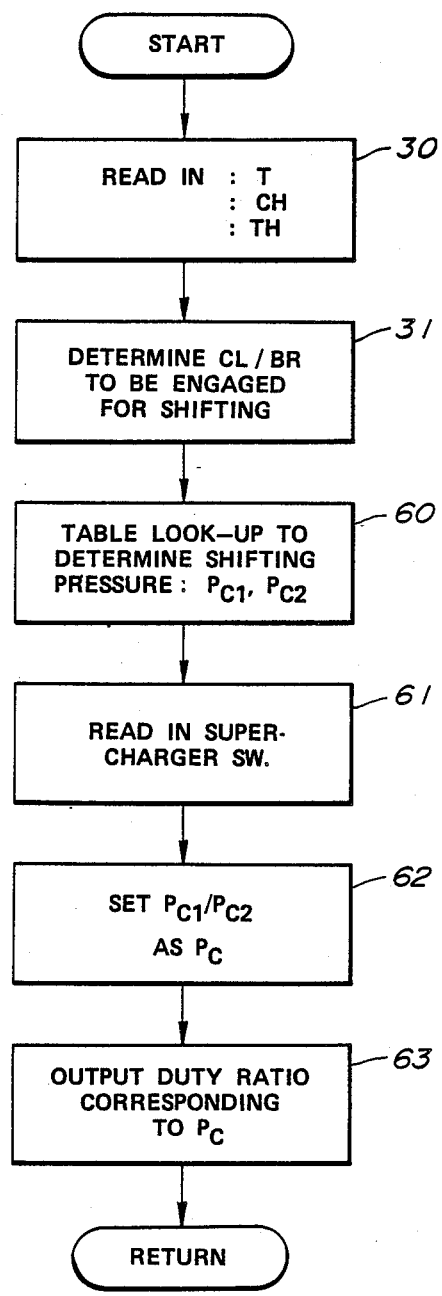
FIG. 9 is a flowchart of a control program used in a fourth embodiment according to the present invention.

FIG. 9 is a flowchart of a control program used in a fourth embodiment where the present invention is applied to a vehicular power train including an internal combustion engine with a supercharger. Such an internal combustion engine is provide with a supercharger control unit. The hardware of this embodiment is substantially the same as the first embodiment except that a signal representing whether the supercharger is operating or not which is determined by the supercharger control unit is used as an input in the place of the retard angle of the ignition timing RT. The supercharger is driven by the engine when operated and it is operated when operating condition demands a high engine output.

Referring to the flowchart shown in FIG. 9, the same reference numerals as used in FIG. 3 are used to designate similar steps. A plurality of first table data are stored in a ROM 22 for different kinds of shifts, each containing first target values of servo activating hydraulic fluid pressure $P_{C1}$ against various sets of values of throttle opening TH and values of transmission oil temperature T. These values are ones to be accomplished when the supercharger is not operating. A plurality, corresponding in number to the first table data, of second table data are stored in the ROM 22 for different kinds fo shifts, each containing second target values of servo activating hydraulic fluid pressure $P_{C2}$ against various sets of values of throttle opening TH and values of transmission oil temperature T. These values are ones to be accomplished when the supercharger is operating. Thus, with the same throttle opening degree and transmission oil temperature, $P_{C1}$ is always less than $P_{C2}$. After executing jobs at steps 30 and 31, a step 60 is executed. At the step 60, among the plurality of first and second tables, predetermined ones of the first and second table data for the above mentioned shift are selected and a table look-up operation of these selected table data is performed using the stored throttle opening TH and transmission oil temperature T to determine a first target servo activating hydraulic pressure $P_{C1}$ and a second target servo activating hydraulic pressure $P_{C2}$. At a step 61, a read-in operation is performed to obtain information from the supercharger control unit whether the supercharger is operating or not. Such information is obtained by detecting closing of a supercharger activating switch. At a step 62, the first target value $P_{C1}$ is set as a target servo activatging fluid pressure $P_C$ when the supercharger is not operating, whereas the second targe value $P_{C2}$ is set as same when te supercharger is operating. At a step 63, a duty ratio D corresponding to the target hydraulic fluid pressure $P_C$ is determined and an electric signal with this duty ratio D is allowed to pass through a duty solenoid 17. In this manner, when the supercharger is operating, the servo activating hydraulic fluid pressure is increased to prevent clip which otherwise would occur in the friction unit.

FIG. 10 is a flowchart of a control program used in a fifth embodiment where the present invention is applied to a vehicular power train including a split mode internal combustion engine. In such an engine, selected cylinders out of all are operated under predetermined condition in order to improve fuel economy. Such an internal combustion engine is provided with a split mode control unit. The hardware of this embodiment is substantially the same as the first embodiment except that a number N of operating cylinders determined by the split mode control unit is used as an input in the place of the retard angle of ignition timing. As is readily recognized, with the came throttle opening, the engine torque decreases as the number N of operating cylinders decreases.

Referring to the flowchart shown in FIG. 10, the same reference numerals are used in FIG. 3 are used to designate similar steps. After executing jobs at steps 30, 31 and 32, a read-in operation is performed to obtain a number N of operating cylinders from the split mode control unit and a deviation $\Delta N$ from a standard number of operating cylinders, viz., a number of all of the cylinders. The split mode control unit carries out a change in the number of operating cylinders in response to a change in operating condition. The engine torque varies in response to such a change. A table is stored in a ROM 22 which contains various correction values of servo activating hydraulic fluid pressure versus various deviation values $\Delta N$. At a step 62, a table look-up operation of this table data is performed to determine a correction value $\Delta P_C$ as a function of the operating cylinder deviation N. At a step 35, a servo activating hydraulic fluid pressure $P_C$ is given by subtracting $\Delta P_C$ from $P_C'$ and a duty ratio D corresponding to this servo activating hydraulic fluid pressure $P_C$ is determined, and an electric current with this duty ratio D is allowed to pass through a duty solenoid 17. The servo activating hydraulic fluid pressure $P_C$ should vary in generally proportion to the number of operating cylinders since the engine torque varies in proportion to the number of operating cylinders.

FIG. 11 is a flowchart of a modification of the control program illustrated in FIG. 10. In this modification, a plurality of table data are stored in a ROM 22 for different kinds of shifts, each containing target values of servo activating hydraulic pressure $P_C$ against various sets of values of throttle opening TH and values of number N of operating cylinders. After executing jobs at steps 30 and 31, among the plurality of table data stored in the ROM 22, a predetermined one table data for the shift instructed by the shift command CH stored at the step 30 is selected at a step 69. At a step 70, a read-in operation is performed is performed to obtain a number N of operating cylinders from the split mode control unit. At a step 72, a table look-up operation of the selected table data is performed using the stored throttle opening TH and the stored number N of operating cylinders to determine a target servo activating hydraulic fluid pressure $P_C$. At a step 74, a duty ratio D corresponding to the servo activating hydraulic fluid pressure $P_C$ is determined and an electric current with this duty ratio D is allowed to pass through a duty solenoid 17.

What is claimed is:

1. A system for a vehicular power train including an internal combustion engine with a throttle and an automatic transmission, the internal combustion engine producing an engine output torque variable in a first predetermined pattern against variation of a first predetermined variable, the internal combustion engine changing the pattern of variation of the engine output torque from the first predetermined pattern to a second predetermined pattern in response to a second predetermined variable, the system comprising:

means for detecting the first predetermined variable and generating a first predetermined variable indicative signal indicative of the first predetermined variable detected;

means for detecting the second predetermined variable and generating a second predetermined variable indicative signal indicative of the second predetermined variable detected;

a source of servo activating hydraulic fluid pressure;

a control unit connected to said first predetermined variable detecting means and said second predetermined variable detecting means for receiving said first predetermined variable indicative signal and said second predetermined variable indicative signal;

said control unit includig;

means for determining a first target value in response to said first predetermined variable indicative signal, means for determining a correction value in respone to said second predetermined value indicative signal, and means or combining said first target value with said correction value to determine a final target value and generating a control signal indicative of said final target value; and means for controlling said servo activating hydraulic fluid pressure acting in a shiftinng friction unit in response to said control signal.

2. A system as claimed in claim 1, wherein said controlling means includes an accumulator disposed to control a rise in the servo activating hydraulic fluid pressure acting in the shifting friction unit, and an electromagnetic means for controlling a back-up pressure of the accumulator in response to said control signal.

3. A system as claimed in claim 1, wherein said second predetermined variable is a retard angle of the engine ignition timing.

4. A system as claimed in claim 1, wheein said second predetermined variable is a compression ratio of the engine.

5. A system as claimed in claim 1, wherein said second predetermined variable is an air fuel ratio.

6. A system as claimed in claim 1, wherein said second predetermined variable is the state of a supercharger driven by the engine.

7. A system as claimed in claim 1, wherein said second predetermined variable is the number of operating cylinders of the engine.

* * * * *